United States Patent
Campbell

(10) Patent No.: US 10,525,387 B2
(45) Date of Patent: Jan. 7, 2020

(54) FILTER CARTRIDGE

(71) Applicant: WHIRLPOOL CORPORATION, Benton Harbor, MI (US)

(72) Inventor: Christopher M. Campbell, Riverside, CA (US)

(73) Assignee: Whirlpool Corporation, Benton Harbor, MI (US)

( * ) Notice: Subject to any disclaimer, the term of this patent is extended or adjusted under 35 U.S.C. 154(b) by 289 days.

(21) Appl. No.: 15/481,343

(22) Filed: Apr. 6, 2017

(65) Prior Publication Data

US 2018/0290083 A1 Oct. 11, 2018

(51) Int. Cl.
*B01D 35/153* (2006.01)
*C02F 1/00* (2006.01)
*B01D 35/147* (2006.01)
*F25D 23/12* (2006.01)

(52) U.S. Cl.
CPC ............ *B01D 35/153* (2013.01); *C02F 1/003* (2013.01); *B01D 35/147* (2013.01); *B01D 2201/303* (2013.01); *B01D 2201/4023* (2013.01); *C02F 2201/005* (2013.01); *C02F 2201/006* (2013.01); *C02F 2301/043* (2013.01); *C02F 2307/12* (2013.01); *F25D 23/126* (2013.01); *F25D 2323/121* (2013.01)

(58) Field of Classification Search
USPC ...................................................... D23/209
See application file for complete search history.

(56) References Cited

U.S. PATENT DOCUMENTS

| | | | |
|---|---|---|---|
| 1,020,212 | A | 3/1912 | Lukowski |
| 1,814,572 | A | 7/1931 | Shaffer |
| 2,056,756 | A | 10/1936 | Wiedhofft |
| 2,107,165 | A | 2/1938 | Rice |
| 2,158,347 | A | 5/1939 | Yirava |

(Continued)

FOREIGN PATENT DOCUMENTS

| | | |
|---|---|---|
| CA | 2113703 | 1/1994 |
| CA | 2215114 | 10/1996 |

(Continued)

*Primary Examiner* — David C Mellon
(74) *Attorney, Agent, or Firm* — Price Heneveld LLP

(57) ABSTRACT

A filter cartridge for operatively coupling to an appliance interface to treat a fluid, such as water, being supplied to the appliance. The interface comprises a bypass valve for actuating the interface between a bypass mode in which the fluid flowing through the interface does not flow through the filter cartridge and a treatment mode in which the fluid flowing through the interface is directed through the filter cartridge for treatment by the filter cartridge. The filter cartridge comprises a cartridge housing having a first end and a second end and extending along a housing longitudinal axis through the first end and the second end. A filter media is contained within the cartridge housing between the first end and the second end. The filter cartridge also has a first end cap on the first end of the cartridge housing and a second end cap on the second end of the cartridge housing. A bypass valve actuator is attached to the cartridge housing and extends distally to an actuator distal end. The bypass valve actuator is configured such that the actuator distal end actuates the bypass valve of the interface as the filter cartridge is coupled to interface.

14 Claims, 8 Drawing Sheets

(56) References Cited

U.S. PATENT DOCUMENTS

| | | |
|---|---|---|
| 2,240,648 A | 5/1941 | Hartman |
| 2,382,278 A | 8/1945 | Widmann |
| 2,544,244 A | 3/1951 | Vokes |
| 2,563,548 A | 8/1951 | Plante |
| 2,568,181 A | 9/1951 | Zimmerman et al. |
| 2,790,572 A | 4/1957 | Flaith et al. |
| 2,932,400 A | 4/1960 | Scavuzzo |
| D188,688 S | 8/1960 | Sicard |
| 2,955,712 A | 10/1960 | Janusz |
| 2,979,208 A | 4/1961 | Humbert, Jr. |
| 3,040,894 A | 6/1962 | Pall |
| 3,105,042 A | 9/1963 | Roosa |
| 3,217,942 A | 11/1965 | Humbert, Jr. et al. |
| 3,228,413 A | 1/1966 | Stevens, Jr. |
| 3,237,770 A | 3/1966 | Humbert, Jr. |
| 3,266,628 A | 8/1966 | Price |
| 3,283,907 A | 11/1966 | Whiting |
| 3,306,451 A | 2/1967 | Kudlaty |
| 3,313,417 A | 4/1967 | Rosaen |
| 3,313,418 A | 4/1967 | Rosaen |
| 3,319,791 A | 5/1967 | Horne |
| 3,330,098 A | 7/1967 | Delin |
| 3,333,697 A | 8/1967 | Rosaen |
| 3,333,703 A | 8/1967 | Scavuzzo et al. |
| 3,342,340 A | 9/1967 | Shindell |
| 3,347,386 A | 10/1967 | Kraissi, Jr. |
| 3,358,839 A | 12/1967 | Simons |
| 3,360,910 A | 1/1968 | Soltis |
| 3,383,841 A | 5/1968 | Olson et al. |
| 3,388,801 A | 6/1968 | Boyd et al. |
| 3,392,837 A | 7/1968 | Sanzenbacher |
| 3,399,776 A | 9/1968 | Knuth |
| 3,423,908 A | 1/1969 | Hart |
| 3,426,998 A | 2/1969 | Kintner |
| 3,434,269 A | 3/1969 | Hyatt |
| 3,447,558 A | 6/1969 | Csemy |
| 3,497,071 A | 2/1970 | Mineo |
| 3,502,214 A | 3/1970 | Mills et al. |
| 3,540,594 A | 11/1970 | Sanderson |
| 3,557,958 A | 1/1971 | Baldwin |
| D220,263 S | 3/1971 | Hughes |
| D221,850 S | 9/1971 | Anderson |
| 3,640,390 A | 2/1972 | Goy et al. |
| 3,715,032 A | 2/1973 | Nicko |
| 3,729,905 A | 5/1973 | Diccianni |
| 3,746,171 A | 7/1973 | Thomsen |
| 3,774,764 A | 11/1973 | Baldwin |
| 3,777,889 A | 12/1973 | Henderson |
| 3,800,948 A | 4/1974 | LaVallee |
| 3,814,251 A | 6/1974 | Aspinwall et al. |
| 3,852,196 A | 12/1974 | Szpur |
| 3,853,761 A | 12/1974 | McClory |
| 3,855,128 A | 12/1974 | Shaltz et al. |
| 3,859,216 A | 1/1975 | Sisson et al. |
| 3,909,221 A | 9/1975 | Bengtsson et al. |
| 3,950,251 A | 4/1976 | Hiller |
| 3,954,624 A | 5/1976 | Petrucci |
| 3,980,457 A | 9/1976 | Smith |
| D243,767 S | 3/1977 | Rutherford |
| 4,046,696 A | 9/1977 | Mouwen |
| 4,051,036 A | 9/1977 | Conrad et al. |
| 4,052,307 A | 10/1977 | Humbert, Jr. |
| 4,077,876 A | 3/1978 | Southall |
| 4,082,673 A | 4/1978 | Cilento |
| 4,094,779 A | 6/1978 | Behman |
| 4,105,561 A | 8/1978 | Domnick |
| D251,380 S | 3/1979 | Casamitjana |
| 4,172,796 A | 10/1979 | Corder |
| 4,199,443 A | 4/1980 | Tauber |
| 4,204,965 A | 5/1980 | Vincent |
| 4,222,875 A | 9/1980 | Sikula, Jr. |
| 4,268,384 A | 5/1981 | Rosaen et al. |
| 4,271,020 A | 6/1981 | Van Meter |
| 4,299,699 A | 11/1981 | Boogay |
| 4,304,736 A | 12/1981 | McMillin et al. |
| 4,317,725 A | 3/1982 | Kume et al. |
| 4,349,438 A | 9/1982 | Sims |
| 4,371,439 A | 2/1983 | Thomlon |
| 4,379,053 A | 4/1983 | Brane |
| 4,398,562 A | 8/1983 | Saarem et al. |
| 4,434,903 A | 3/1984 | Cooke |
| 4,446,987 A | 5/1984 | White |
| 4,495,072 A | 1/1985 | Fields |
| 4,497,348 A | 2/1985 | Sedam |
| 4,505,823 A | 3/1985 | Klein |
| 4,515,692 A | 5/1985 | Chandler et al. |
| 4,520,950 A | 6/1985 | Jeans |
| 4,529,514 A | 7/1985 | Gruett |
| 4,529,515 A | 7/1985 | Selz |
| 4,559,136 A | 12/1985 | Dockery |
| 4,571,953 A | 2/1986 | Caruso |
| 4,601,821 A | 7/1986 | Sherman et al. |
| 4,608,166 A | 8/1986 | Cain |
| 4,615,812 A | 10/1986 | Darling |
| 4,617,118 A | 10/1986 | Smart |
| 4,637,874 A | 1/1987 | Ansteth |
| 4,645,601 A | 2/1987 | Regunathan et al. |
| 4,684,471 A | 8/1987 | Manojlovic |
| 4,719,012 A | 1/1988 | Groezinger et al. |
| 4,731,183 A | 3/1988 | Schumacher, II |
| 4,735,716 A | 4/1988 | Petrucci et al. |
| 4,764,275 A | 8/1988 | Robichaud |
| 4,806,240 A | 2/1989 | Giordano et al. |
| 4,855,041 A | 8/1989 | Church et al. |
| 4,877,521 A | 10/1989 | Petrucci et al. |
| 4,904,382 A | 2/1990 | Thomsen |
| 4,915,831 A | 4/1990 | Taylor |
| 4,935,135 A | 6/1990 | Nakashima et al. |
| 4,948,503 A | 8/1990 | Baumann et al. |
| 4,948,505 A | 8/1990 | Petrucci et al. |
| 4,956,086 A | 9/1990 | Thomsen et al. |
| 4,989,636 A | 2/1991 | Hunter et al. |
| 5,019,251 A | 5/1991 | Sundholm |
| D322,836 S | 12/1991 | Petrucci et al. |
| 5,083,442 A | 1/1992 | Vlock |
| 5,098,559 A | 3/1992 | Mack et al. |
| 5,102,543 A | 4/1992 | Burroughs |
| 5,108,598 A | 4/1992 | Posner |
| 5,114,572 A | 5/1992 | Hunter et al. |
| 5,133,382 A | 7/1992 | Nielsen |
| 5,135,645 A | 8/1992 | Sklenak et al. |
| 5,139,050 A | 8/1992 | Otto |
| D330,712 S | 11/1992 | Pingel et al. |
| 5,186,830 A | 2/1993 | Rait |
| 5,256,285 A | 10/1993 | Tomita et al. |
| 5,273,255 A | 12/1993 | Klicek et al. |
| 5,300,223 A | 4/1994 | Wright |
| 5,336,406 A | 8/1994 | Standford et al. |
| 5,350,506 A | 9/1994 | Dombek et al. |
| 5,354,464 A | 10/1994 | Slovak et al. |
| 5,362,390 A | 11/1994 | Widenhoefer et al. |
| 5,380,432 A | 1/1995 | Brandt |
| D356,625 S | 3/1995 | Petrucci et al. |
| 5,397,462 A | 3/1995 | Higashijima et al. |
| 5,397,468 A | 3/1995 | Chomka et al. |
| 5,382,359 A | 7/1995 | Brandt |
| 5,456,830 A | 10/1995 | Stanford et al. |
| 5,460,719 A | 10/1995 | Clack et al. |
| 5,468,386 A | 11/1995 | Ardes |
| 5,486,288 A | 1/1996 | Standford et al. |
| 5,501,791 A | 3/1996 | Theisen et al. |
| 5,503,740 A | 4/1996 | Callaghan et al. |
| 5,516,425 A | 5/1996 | Brieden et al. |
| 5,520,801 A | 5/1996 | Gerber et al. |
| 5,527,451 A | 6/1996 | Hembree et al. |
| 5,560,824 A | 10/1996 | Sann et al. |
| 5,567,310 A | 10/1996 | Nakashima |
| 5,567,311 A | 10/1996 | Jang |
| 5,589,060 A | 12/1996 | Gerbert et al. |
| 5,591,332 A | 1/1997 | Reid et al. |
| 5,607,582 A | 3/1997 | Yamazaki et al. |
| 5,611,923 A | 3/1997 | Suri et al. |
| 5,653,871 A | 8/1997 | Thomsen |
| 5,681,475 A | 10/1997 | Lamensdorf et al. |

(56) References Cited

U.S. PATENT DOCUMENTS

| | | |
|---|---|---|
| 5,688,396 A | 11/1997 | Baumann et al. |
| 5,695,168 A | 12/1997 | Williams |
| 5,698,093 A | 12/1997 | Pyle et al. |
| 5,698,098 A | 12/1997 | Ernst et al. |
| 5,700,371 A | 12/1997 | Koslow |
| 5,707,518 A | 1/1998 | Coates et al. |
| 5,715,699 A | 2/1998 | Coates et al. |
| 5,723,255 A | 3/1998 | Texter et al. |
| 5,725,623 A | 3/1998 | Bowerman et al. |
| 5,744,030 A | 4/1998 | Reid et al. |
| 5,753,107 A | 5/1998 | Magnusson et al. |
| 5,753,111 A | 5/1998 | Patton et al. |
| 5,785,848 A | 7/1998 | Strand |
| D398,367 S | 9/1998 | Andreponi et al. |
| 5,800,702 A | 9/1998 | Taylor-McCune et al. |
| 5,813,245 A | 9/1998 | Coates et al. |
| 5,826,854 A | 10/1998 | Janvrin et al. |
| 5,846,417 A | 12/1998 | Jiang et al. |
| 5,858,227 A | 1/1999 | Stone et al. |
| 5,863,425 A | 1/1999 | Herichy et al. |
| D410,520 S | 6/1999 | King |
| 5,907,958 A | 6/1999 | Coates et al. |
| 5,914,037 A | 6/1999 | Yen et al. |
| 5,925,025 A | 7/1999 | Weilbacher et al. |
| 5,925,245 A | 7/1999 | Bradford et al. |
| 5,928,504 A | 7/1999 | Hembre et al. |
| 5,947,462 A | 9/1999 | Roussel |
| 6,000,674 A | 12/1999 | Chen |
| 6,024,869 A | 2/2000 | Stifelman |
| 6,027,644 A | 2/2000 | Magnusson et al. |
| D423,081 S | 4/2000 | Niemeyer |
| 6,068,770 A | 5/2000 | Niermeyer et al. |
| 6,086,752 A | 7/2000 | Dell et al. |
| 6,090,283 A | 7/2000 | Schumann et al. |
| 6,120,685 A | 9/2000 | Carlson et al. |
| 6,129,841 A | 10/2000 | Dann |
| 6,132,176 A | 10/2000 | Higgins |
| 6,139,739 A | 10/2000 | Hamlin et al. |
| D435,631 S | 12/2000 | Janik et al. |
| 6,193,884 B1 | 2/2001 | Magnusson et al. |
| 6,224,754 B1 | 5/2001 | Schiavon et al. |
| RE37,216 E | 6/2001 | Koslow |
| 6,241,132 B1 | 6/2001 | Morrison |
| 6,303,031 B1 | 10/2001 | Senner |
| 6,325,929 B1 | 12/2001 | Bassett |
| 6,337,015 B1 | 1/2002 | Poirier |
| 6,355,177 B2 | 3/2002 | Senner et al. |
| 6,360,764 B1 | 3/2002 | Fritze |
| 6,475,379 B2 | 5/2002 | Jousset et al. |
| 6,409,786 B1 | 6/2002 | Wright et al. |
| 6,423,222 B1 | 7/2002 | Shively et al. |
| 6,458,269 B1 | 10/2002 | Bassett et al. |
| 6,485,643 B2 | 11/2002 | Vardion |
| 6,500,335 B2 | 12/2002 | Janik et al. |
| D472,299 S | 3/2003 | Fritze |
| 6,532,758 B2 | 3/2003 | DuHack |
| D472,604 S | 4/2003 | Fritze |
| 6,579,455 B1 | 6/2003 | Muzik et al. |
| 6,632,355 B2 | 10/2003 | Fritze |
| 6,652,749 B2 | 11/2003 | Stankowski et al. |
| D484,568 S | 12/2003 | Janik et al. |
| 6,789,691 B2 | 9/2004 | Martin et al. |
| 6,936,084 B2 | 8/2005 | Schlensker et al. |
| 6,977,039 B2 | 12/2005 | Knoll et al. |
| 7,000,894 B2 | 2/2006 | Olson et al. |
| 7,067,054 B2 | 6/2006 | Fritze |
| 7,147,772 B2 | 12/2006 | Fritze |
| 7,147,773 B2 | 12/2006 | Mitchell et al. |
| 7,326,342 B2 | 2/2008 | Richmond et al. |
| D567,898 S | 4/2008 | Miller |
| 7,407,148 B2 | 8/2008 | Bassett et al. |
| 7,442,301 B2 | 10/2008 | Huda |
| 7,459,078 B2 | 12/2008 | Klein et al. |
| 7,481,926 B2 | 1/2009 | Dworatzek |
| 7,481,928 B2 | 1/2009 | Fritze |
| D599,880 S | 9/2009 | Rampen et al. |
| 7,610,932 B2 | 11/2009 | Olson et al. |
| 7,638,042 B2 | 12/2009 | Astle et al. |
| 7,695,619 B2 | 4/2010 | Kurth et al. |
| 7,744,758 B2 | 6/2010 | Dworatzek et al. |
| 7,763,170 B2 | 7/2010 | Bassett et al. |
| 7,799,220 B2 | 9/2010 | Fritze |
| 7,909,999 B2 | 3/2011 | Noh et al. |
| 7,955,500 B2 | 6/2011 | Abdalla et al. |
| 7,959,010 B2 | 6/2011 | Hawkins et al. |
| 8,070,945 B2 | 12/2011 | Stankowski et al. |
| 8,097,061 B2 | 1/2012 | Smith et al. |
| 8,097,156 B2 | 1/2012 | Tubby et al. |
| 8,097,157 B2 | 1/2012 | Tubby et al. |
| 8,097,158 B2 | 1/2012 | Tubby et al. |
| 8,118,997 B2 | 2/2012 | Ebrom et al. |
| 8,137,551 B1 | 3/2012 | Huda et al. |
| 8,236,176 B2 | 8/2012 | Fall et al. |
| 8,245,851 B2 | 8/2012 | Hawkins et al. |
| 8,268,170 B2 | 9/2012 | Core et al. |
| 8,333,818 B2 | 12/2012 | Foerster et al. |
| 8,354,024 B2 | 1/2013 | Ihle et al. |
| 8,356,716 B1 | 1/2013 | Kruckenberg et al. |
| 8,366,930 B2 | 2/2013 | Huda et al. |
| 8,393,167 B2 | 3/2013 | Krause et al. |
| 8,398,853 B2 | 3/2013 | An et al. |
| 8,413,818 B1 | 4/2013 | Kruckenberg et al. |
| 8,442,042 B2 | 5/2013 | McCoy |
| 8,454,826 B2 | 6/2013 | Donnelly et al. |
| 8,562,830 B2 | 10/2013 | Reid |
| 8,580,109 B2 | 11/2013 | Kruckenberg et al. |
| 8,591,736 B2 | 11/2013 | Kruckenberg et al. |
| 8,627,675 B2 | 1/2014 | Kruckenberg et al. |
| 8,673,146 B2 | 3/2014 | Huda et al. |
| 8,709,246 B2 | 4/2014 | Branscomb |
| 8,887,324 B2 | 11/2014 | Klicpera |
| 8,911,623 B2 | 12/2014 | Tubby et al. |
| 8,950,052 B2 | 2/2015 | Kruckenberg et al. |
| 9,044,695 B2 | 6/2015 | Sann et al. |
| 9,061,225 B2 | 6/2015 | Sherman et al. |
| 9,157,677 B2 | 10/2015 | Mitchell |
| 9,211,488 B2 | 12/2015 | South et al. |
| 9,233,322 B1 | 1/2016 | Huda et al. |
| 9,345,995 B2 | 5/2016 | Tubby et al. |
| 9,494,362 B2 | 11/2016 | Lim et al. |
| 9,533,243 B2 | 1/2017 | Kruckenberg et al. |
| 9,687,762 B2 | 6/2017 | Tubby et al. |
| 9,885,445 B2 | 2/2018 | Joung et al. |
| 9,901,852 B2 | 2/2018 | Huda et al. |
| 9,931,589 B2 | 4/2018 | Tubby et al. |
| 9,993,757 B2 | 6/2018 | Joung et al. |
| 10,040,703 B2 | 8/2018 | Huda et al. |
| 2001/0045386 A1 | 11/2001 | Stankowski et al. |
| 2002/0017497 A1 | 2/2002 | Fritze |
| 2002/0020661 A1 | 2/2002 | Jainek |
| 2002/0023614 A1 | 2/2002 | Hartmann et al. |
| 2002/0023863 A1 | 2/2002 | Binder et al. |
| 2002/0036162 A1 | 3/2002 | Magnusson et al. |
| 2002/0043491 A1 | 4/2002 | Janik et al. |
| 2002/0166805 A1 | 11/2002 | Minns et al. |
| 2003/0024860 A1 | 2/2003 | Fritze |
| 2003/0057146 A1* | 3/2003 | Rickle ............... B01D 29/21 210/243 |
| 2003/0141235 A1 | 7/2003 | Stankowski et al. |
| 2003/0178354 A1 | 9/2003 | Wall |
| 2004/0211717 A1 | 10/2004 | Michell et al. |
| 2004/0211931 A1* | 10/2004 | Olson ............... B01D 35/147 251/149.9 |
| 2005/0252841 A1 | 11/2005 | Bassett et al. |
| 2006/0060512 A1 | 3/2006 | Astle et al. |
| 2006/0070942 A1 | 4/2006 | An |
| 2006/0169629 A1 | 8/2006 | Donnelly et al. |
| 2006/0191827 A1 | 8/2006 | Fritze |
| 2006/0272995 A1 | 12/2006 | Fritze |
| 2007/0012611 A1 | 1/2007 | An |
| 2007/0227959 A1 | 10/2007 | Sinur et al. |
| 2007/0295667 A1 | 12/2007 | Ruprecht |
| 2008/0000820 A1 | 1/2008 | Mitchell |
| 2008/0060982 A1 | 3/2008 | Krause et al. |

(56) References Cited

U.S. PATENT DOCUMENTS

| | | |
|---|---|---|
| 2008/0078710 A1 | 4/2008 | Larkner |
| 2008/0078723 A1 | 4/2008 | Larkner |
| 2008/0185330 A1 | 8/2008 | Sinur et al. |
| 2008/0223775 A1 | 9/2008 | An |
| 2009/0045926 A1 | 2/2009 | Ebrom et al. |
| 2009/0293528 A1 | 12/2009 | Buchstab et al. |
| 2009/0321340 A1 | 12/2009 | Rampen et al. |
| 2010/0018238 A1 | 1/2010 | Gerner et al. |
| 2010/0102082 A1 | 4/2010 | Ebrom et al. |
| 2010/0264078 A1 | 10/2010 | Bassett et al. |
| 2011/0147297 A1 | 6/2011 | Core et al. |
| 2011/0174705 A1 | 7/2011 | Branscomb |
| 2012/0000858 A1 | 1/2012 | Butler et al. |
| 2012/0145621 A1 | 6/2012 | Tubby et al. |
| 2013/0068682 A1 | 3/2013 | Kruckenberg et al. |
| 2013/0068683 A1 | 3/2013 | Kruckenberg et al. |
| 2013/0068684 A1 | 3/2013 | Kruckenberg et al. |
| 2014/0138292 A1 | 5/2014 | Kruckenberg et al. |
| 2014/0144819 A1 | 5/2014 | Verdegan et al. |
| 2017/0056794 A1 | 3/2017 | Chernov et al. |
| 2017/0259195 A1 | 9/2017 | Mitchell |
| 2019/0046903 A1* | 2/2019 | Boden .................. B01D 29/54 |

FOREIGN PATENT DOCUMENTS

| | | |
|---|---|---|
| CA | 2221645 | 8/2003 |
| CN | 2889448 | 4/2007 |
| DE | 2453445 | 5/1976 |
| DE | 2456428 | 8/1976 |
| DE | 3048219 | 7/1982 |
| DE | 3122047 | 12/1982 |
| DE | 3409219 | 9/1985 |
| DE | 3432855 | 3/1986 |
| DE | 3446772 | 3/1986 |
| DE | 3538589 | 5/1987 |
| DE | 3622153 | 8/1987 |
| DE | 3613041 | 10/1987 |
| DE | 3903675 | 8/1990 |
| DE | 4023753 | 1/1992 |
| DE | 4324158 | 1/1994 |
| DE | 4408888 | 9/1994 |
| DE | 4330839 | 3/1995 |
| DE | 4331467 | 3/1995 |
| DE | 4331598 | 3/1995 |
| DE | 4411279 | 10/1995 |
| DE | 29610290 | 8/1996 |
| DE | 29922324 | 5/2001 |
| DE | 102006034943 | 1/2008 |
| EP | 0040133 | 11/1981 |
| EP | 0079841 | 5/1983 |
| EP | 0408375 | 1/1991 |
| EP | 0438595 | 1/1991 |
| EP | 0319518 | 5/1993 |
| EP | 0937868 | 8/1999 |
| EP | 1008375 | 6/2000 |
| EP | 1058000 | 6/2000 |
| EP | 1106795 | 6/2001 |
| EP | 1136110 | 9/2001 |
| FR | 2684738 | 6/1993 |
| FR | 2779661 | 12/1999 |
| GB | 450490 | 7/1936 |
| GB | 541488 | 11/1941 |
| GB | 841603 | 7/1960 |
| GB | 915760 | 1/1963 |
| GB | 944384 | 12/1963 |
| GB | 982548 | 2/1965 |
| GB | 1025981 | 4/1966 |
| GB | 1239068 | 7/1971 |
| GB | 1296051 | 11/1972 |
| GB | 1427031 | 3/1976 |
| GB | 2018956 | 10/1979 |
| GB | 2021445 | 12/1979 |
| GB | 2045102 | 10/1980 |
| GB | 2061122 | 5/1981 |
| GB | 2062810 | 5/1981 |
| GB | 2088021 | 6/1982 |
| GB | 2029111 | 12/1982 |
| GB | 2132499 | 7/1984 |
| GB | 2162079 | 1/1986 |
| GB | 2139247 | 9/1987 |
| GB | 2188399 | 9/1987 |
| GB | 2206292 | 1/1989 |
| GB | 2208068 | 2/1989 |
| GB | 2230473 | 10/1990 |
| GB | 2230589 | 10/1990 |
| GB | 2233068 | 1/1991 |
| GB | 2233727 | 1/1991 |
| GB | 2312383 | 10/1997 |
| GB | 2346568 | 8/2000 |
| IT | 678800 | 12/1964 |
| JP | 404083578 | 3/1992 |
| WO | 9205856 | 4/1992 |
| WO | 9212784 | 8/1992 |
| WO | 9218218 | 10/1992 |
| WO | 9313847 | 7/1993 |
| WO | 9507745 | 3/1995 |
| WO | 9513468 | 5/1995 |
| WO | 9527574 | 10/1995 |
| WO | 9606668 | 3/1996 |
| WO | 9637274 | 11/1996 |
| WO | 9726066 | 7/1997 |
| WO | 9805408 | 2/1998 |
| WO | 9817371 | 4/1998 |
| WO | 9908773 | 2/1999 |
| WO | 9937375 | 7/1999 |
| WO | 9937908 | 7/1999 |
| WO | 9965589 | 12/1999 |
| WO | 0020093 | 4/2000 |
| WO | 01180967 | 1/2001 |
| WO | 0117657 | 3/2001 |
| WO | 0119494 | 3/2001 |
| WO | 01117654 | 3/2001 |
| WO | 0123819 | 4/2001 |
| WO | 0130480 | 5/2001 |
| WO | 134272 | 5/2001 |
| WO | 0139859 | 6/2001 |
| WO | 0464312 | 9/2001 |
| WO | 0183079 | 11/2001 |
| WO | 0191881 | 12/2001 |
| WO | 0192714 | 12/2001 |
| WO | 0205926 | 1/2002 |
| WO | 0211854 | 2/2002 |
| WO | 2010056711 | 5/2010 |
| WO | 2010070102 | 6/2010 |
| WO | 2011047754 | 4/2011 |

* cited by examiner

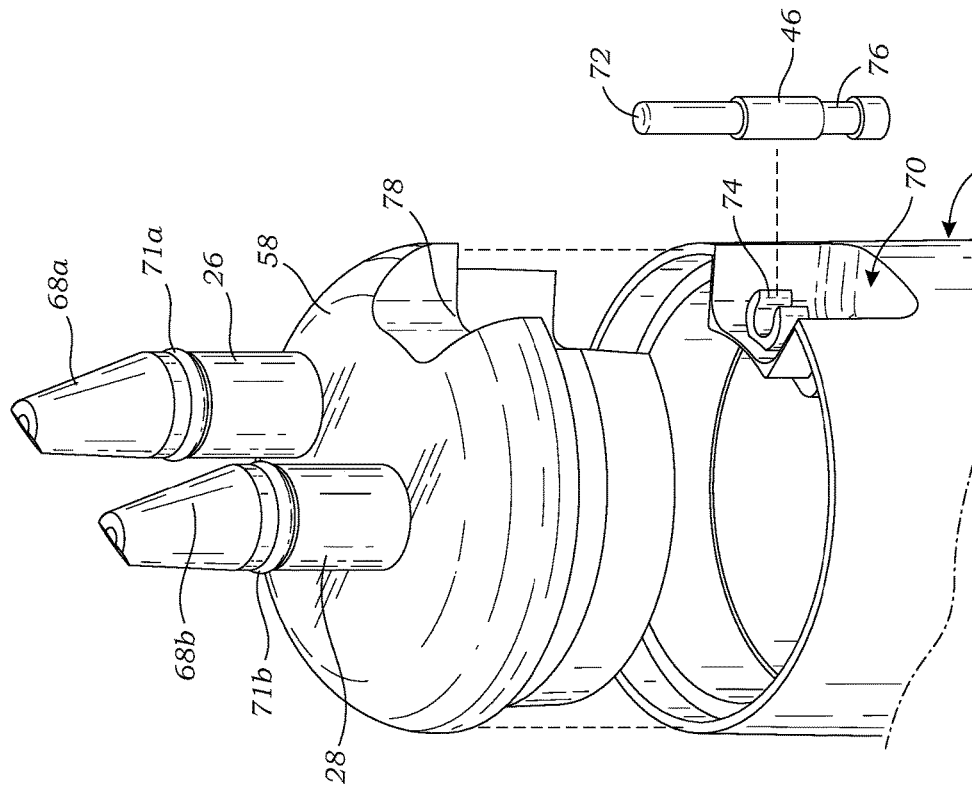
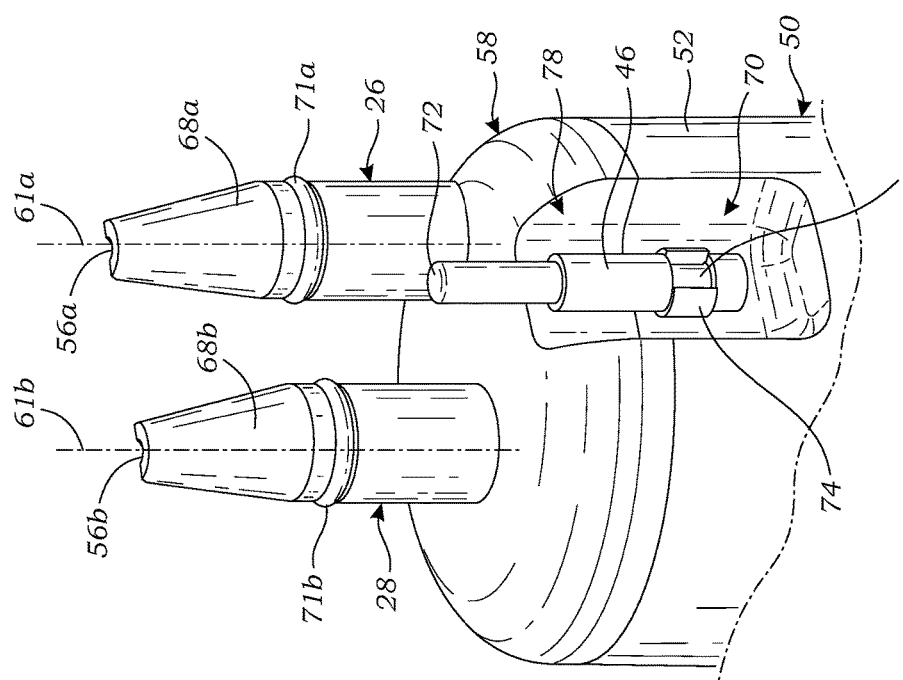

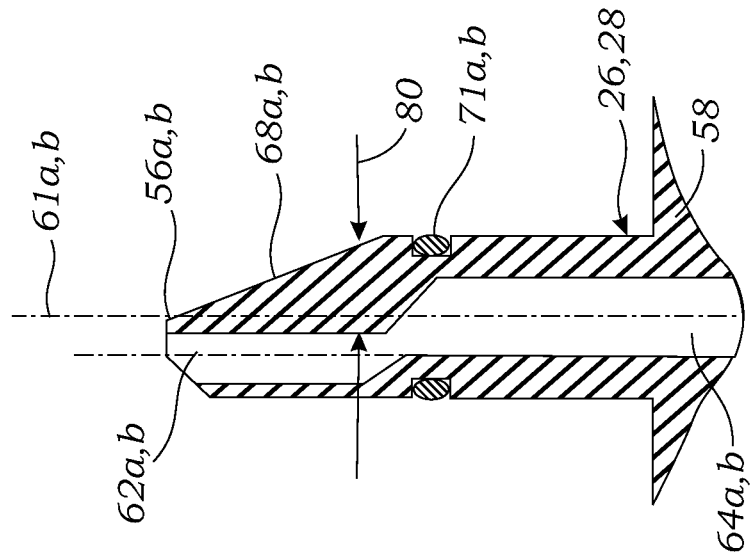
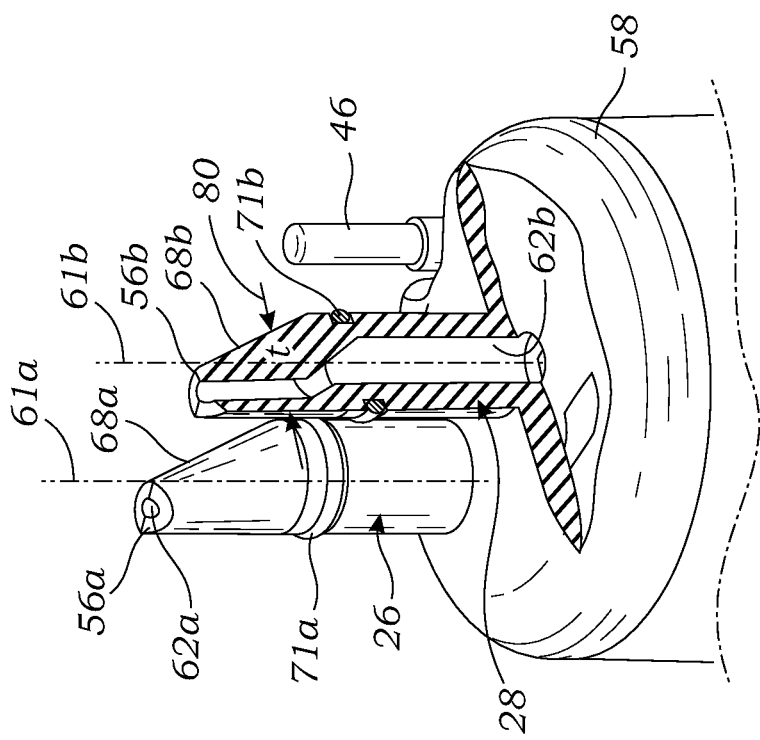

FILTER CARTRIDGE

BACKGROUND

The field of the invention generally relates to fluid treatment cartridges, and more particularly, to a removable filter cartridge for an appliance, such as a refrigerator.

Removable water filter cartridges have previously been disclosed for use in appliances which utilize water, especially where the water is for human consumption. For example, water filter cartridges have been used in refrigerators to filter the water to supply the ice maker used to supply an automatic ice maker and/or a water dispenser built into the refrigerator. A water supply line is connected to the refrigerator to supply the water to the refrigerator, and the water is routed through tubing in the refrigerator to the water filter cartridge and then to the ice maker and/or water dispenser. Several examples of refrigerators having water filter cartridges are disclosed in U.S. Pat. Nos. 6,120,685, 6,337,015, 7,000,894 and 7,147,773.

Because the water filter cartridges eventually become ineffective and need to be changed, a water filter cartridge and an appliance interface to which the water filter cartridge is connected are configured to allow the water filter cartridge to be removed and replaced with a new water filter cartridge. The water filter cartridge has a cartridge inlet, a cartridge outlet, and a filter in fluid communication with the cartridge inlet and cartridge outlet. The interface, also referred to herein as a head assembly, includes an inlet port which connects to the cartridge inlet and an outlet port which connects to the cartridge outlet. The interface also has a supply inlet connected to the water supply and a supply outlet which supplies the water to the ice maker and/or water dispenser.

In order to facilitate the replacement of the water filter cartridge, i.e. the removal of a used cartridge and installation of a new cartridge, some previous appliance interfaces have valves which are actuated by the water filter cartridge, such as upon installing and removing the water filter cartridge to the appliance interface. Some interfaces also include a bypass valve which is opened when a water filter cartridge is not installed in order to allow water to flow to the ice maker and/or water dispenser even without a water filter cartridge. Thus, the water filter cartridge may also actuate the bypass valve such that installing the water filter cartridge closes the bypass valve, and removing the water filter cartridge opens the bypass valve. Examples of filter cartridges which actuate an inlet and outlet valve and/or a bypass valve are disclosed in U.S. Pat. Nos. 7,000,894, 7,147,773, and 5,256,285.

SUMMARY

In one embodiment, the present invention is directed to a new filter cartridge which is configured to be removably coupled to an appliance interface (also referred to as an "interface" or "head assembly") and which is also configured to actuate an inlet valve, an outlet valve, and/or a bypass valve of the interface. The filter cartridge includes a cartridge housing having a first end and a second end and extending along a housing longitudinal axis through the first end and the second end. A filter media is contained within the cartridge housing between the first end and the second end. The filter cartridge has a first end cap covering the first end of the cartridge housing and a second end cap covering the second end of the cartridge housing. An inlet fitting extends from the first end cap to an inlet distal end spaced away from the first end cap along an inlet longitudinal axis. The inlet fitting has an inlet lumen in fluid communication with a filter inlet of the filter media. The inlet fitting also has an inlet slanted exterior surface which slants toward the inlet longitudinal axis as the inlet slanted exterior surface extends toward the inlet distal end. The inlet fitting is configured to be received by an inlet port of the interface. The inlet slanted exterior surface is configured to actuate an inlet valve of the interface.

An outlet fitting also extends from the first end cap to an outlet distal end along an outlet longitudinal axis. The outlet fitting has an outlet lumen in fluid communication with a filter outlet of the filter media. The outlet fitting also has an outlet slanted exterior surface which slants toward the outlet longitudinal axis as the outlet slanted exterior surface extends toward the outlet distal end. The outlet fitting is configured to be received by an outlet port of the interface; and the outlet slanted exterior surface is configured to actuate an outlet port of the interface.

The filter cartridge also has a bypass valve actuator attached to the cartridge housing proximate the first end of the cartridge. The bypass valve actuator has a proximal end attached to the cartridge housing and extends distally to an actuator distal end. The bypass valve actuator is configured to actuate a bypass valve of an appliance interface as the filter cartridge is coupled to the appliance interface. In one aspect of the present invention, the bypass valve actuator may comprise an elongated rod having a rod first end attached to the cartridge housing. In one aspect, the rod may extend distally and substantially parallel to the housing longitudinal axis from the rod first end to a rod distal end which forms the actuator distal end.

In another aspect of the present invention, the cartridge housing has a notch proximate the first end of the cartridge housing, and the bypass valve actuator is attached to the cartridge housing in the notch. The notch forms an area of the cartridge housing which is indented from the surrounding exterior surface of the housing. The notch has a depth from the surrounding exterior surface which allows the bypass valve actuator to be attached to the housing in the notch such that the bypass valve actuator does not extend radially outside the notch. In other words, the bypass valve actuator is radially within the perimeter of the extrapolated surface of the cartridge housing.

In still another aspect, the rod may be attached to the cartridge housing using a clip attached to the cartridge housing. The clip may comprise one or more pliant tangs into which the rod is inserted to hold the first end of the rod.

In still another aspect, the rod may be cylindrical and have a recessed cylindrical portion which is received in the clip. In another feature, the rod and clip do not extend radially outside the notch.

In still another aspect, the first end of the rod may be permanently attached to the cartridge housing or even integrally formed with the cartridge housing.

In yet another aspect, the inlet slanted exterior surface may be formed by tapering a thickness of the inlet fitting. Similarly, the outlet slanted exterior surface may be formed by tapering a thickness of the outlet fitting.

In still another feature, the inlet fitting has an inlet seal which provides a fluid tight seal between the inlet fitting and the inlet port when the inlet fitting is received in the inlet port. The outlet fitting has an outlet seal which provides a fluid tight seal between the outlet fitting and the outlet port when the outlet fitting is received in the outlet port.

In another aspect, the inlet longitudinal axis and the outlet longitudinal axis are substantially parallel to the housing longitudinal axis.

Another embodiment of the present invention is directed to a fluid filter assembly comprising a filter cartridge in combination with an appliance interface. Accordingly, the fluid filter assembly comprises a filter cartridge, as described above. The fluid filter assembly also comprises an appliance interface which is configured to receive the filter cartridge. The appliance interface has an inlet port configured to receive the inlet fitting of the filter cartridge. The inlet port has an inlet valve which is actuated by the inlet slanted exterior surface when the inlet fitting is received by the inlet port. The appliance interface also has an outlet port configured to receive the outlet fitting of the filter cartridge. The outlet port has an outlet valve which is actuated by the outlet slanted exterior surface when the outlet fitting is received by the outlet port. Typically, the inlet valve and outlet valve are opened when the inlet port receives the inlet fitting and the outlet port receives the outlet fitting, respectively, upon installation of the filter cartridge to the appliance interface. Conversely, the inlet valve and outlet valve close (the valves are typically biased to the closed position) upon removal of the inlet fitting and outlet fitting upon removal of the filter cartridge from the appliance interface.

The appliance interface also includes a bypass valve assembly. The bypass valve assembly includes a bypass passageway which places the inlet lumen and outlet lumen in fluid communication. The bypass valve assembly further includes a bypass valve which is configured to open and close the bypass valve passageway. The bypass valve is biased to a normally open position. The bypass valve assembly is configured such that the bypass valve actuator actuates the bypass valve to close the bypass valve (i.e., the bypass valve blocks the bypass passageway from allowing flow between the inlet lumen and the outlet lumen through the bypass passageway) when the filter cartridge is mated to the appliance interface.

The appliance interface also has a supply inlet which is in fluid communication with a water supply, such as a water supply pipe, and also with the inlet port. The appliance interface also has a supply outlet in fluid communication with the outlet port, and which supplies the treated fluid after flowing through the filter cartridge to the appliance, such as an ice maker and/or water dispenser.

In additional aspects, the filter cartridge of the fluid filter assembly may include any of the additional features and aspects described above, and the appliance interface is configured accordingly. For example, the bypass valve of the appliance interface may be configured to be actuated by the rod of the filter cartridge in which the rod has a first end attached to the cartridge housing and the rod extends distally substantially parallel to the housing longitudinal axis. Similarly, the inlet port and outlet port of the appliance interface may be configured to provide a fluid tight seal with the inlet seal and outlet seal, respectively, of the filter cartridge.

The installation and operation of the fluid filter assembly to replace a filter cartridge installed in an appliance will now be described. With an old filter cartridge installed on the appliance interface of the appliance, the inlet slanted exterior surface of the filter cartridge actuates the inlet valve to the open position, the outlet slanted exterior surface of the filter cartridge actuates the outlet valve to the open position, and the bypass valve actuator actuates the bypass valve to the closed position. In this situation, fluid coming from the fluid supply flows into the supply inlet of the appliance interface, through the open inlet valve, and into the inlet fitting of the filter cartridge. The fluid then flows through the inlet fitting into the filter inlet, through the filter media, out through the filter outlet to the outlet fitting. Then, the fluid flows through the outlet fitting, through the open outlet valve, into the outlet port and finally to the supply outlet which supplies the appliance with treated fluid.

The installed filter cartridge is removed from the interface by pulling the filter cartridge proximally along the housing longitudinal axis. As the filter cartridge moves proximally, the inlet slanted exterior surface of the inlet fitting also moves proximally out of the inlet port which releases the inlet valve allowing it to move to the closed position. Similarly, the outlet slanted exterior surface of the outlet fitting moves proximally out of the outlet port which releases the outlet valve allowing it to move to the closed position. At the same time, movement of the bypass valve actuator allows the bypass valve to move to open position. In this situation, the fluid coming from the fluid supply flows into the inlet supply port, and is blocked from flowing into the inlet fitting by the closed inlet valve. Thus, the fluid flowing into the inlet supply port flows through the open bypass valve, into the outlet supply port and then to the supply outlet which supplies the appliance with untreated fluid, as the fluid cartridge has been removed.

A new filter cartridge is then installed by inserting the cartridge onto the interface and pushing it distally. As the filter cartridge moves distally onto the interface, the inlet fitting is received in the inlet port, the outlet fitting is received in the outlet port, and the bypass valve actuator actuates the bypass valve. As the filter cartridge is moved distally, the inlet slanted exterior surface of the inlet fitting actuates the inlet valve to the open position, the outlet slanted exterior surface of the outlet fitting actuates the outlet valve to the open position, and the bypass valve actuator actuates the bypass valve to the closed position. When the fluid cartridge is fully installed on the interface, the fluid flow is the same as described above with the old filter cartridge installed onto the interface.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant:

FIG. 3A is a partial, perspective view of the distal end of the filter cartridge of FIG. 1, according to one embodiment of the present invention;

FIG. 3B is a partial, perspective, exploded view of the distal end of the filter cartridge of FIG. 1, according to one embodiment of the present invention;

FIG. 4 is partial cross-sectional view of the distal end of the filter cartridge of FIG. 1, according to one embodiment of the present invention.

FIG. 5 is a cross-sectional view of an inlet fitting (or outlet fitting) of the filter cartridge of FIG. 1, according to one embodiment of the present invention;

DETAILED DESCRIPTION

Figure 1:
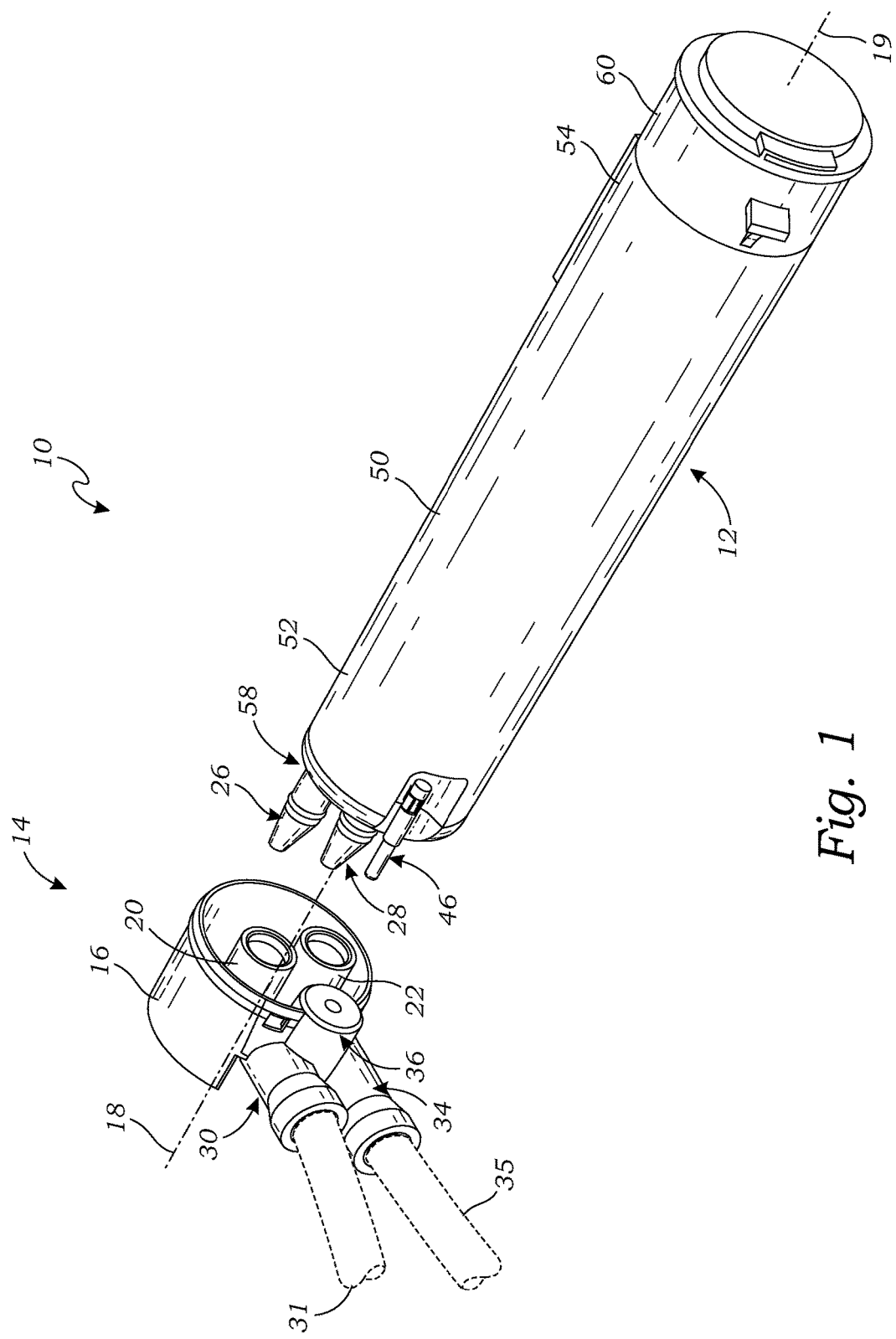
FIG. 1 is side, perspective view of a fluid filter assembly including a filter cartridge uninstalled from an appliance interface, according to one embodiment of the present invention.
Figure 2A:
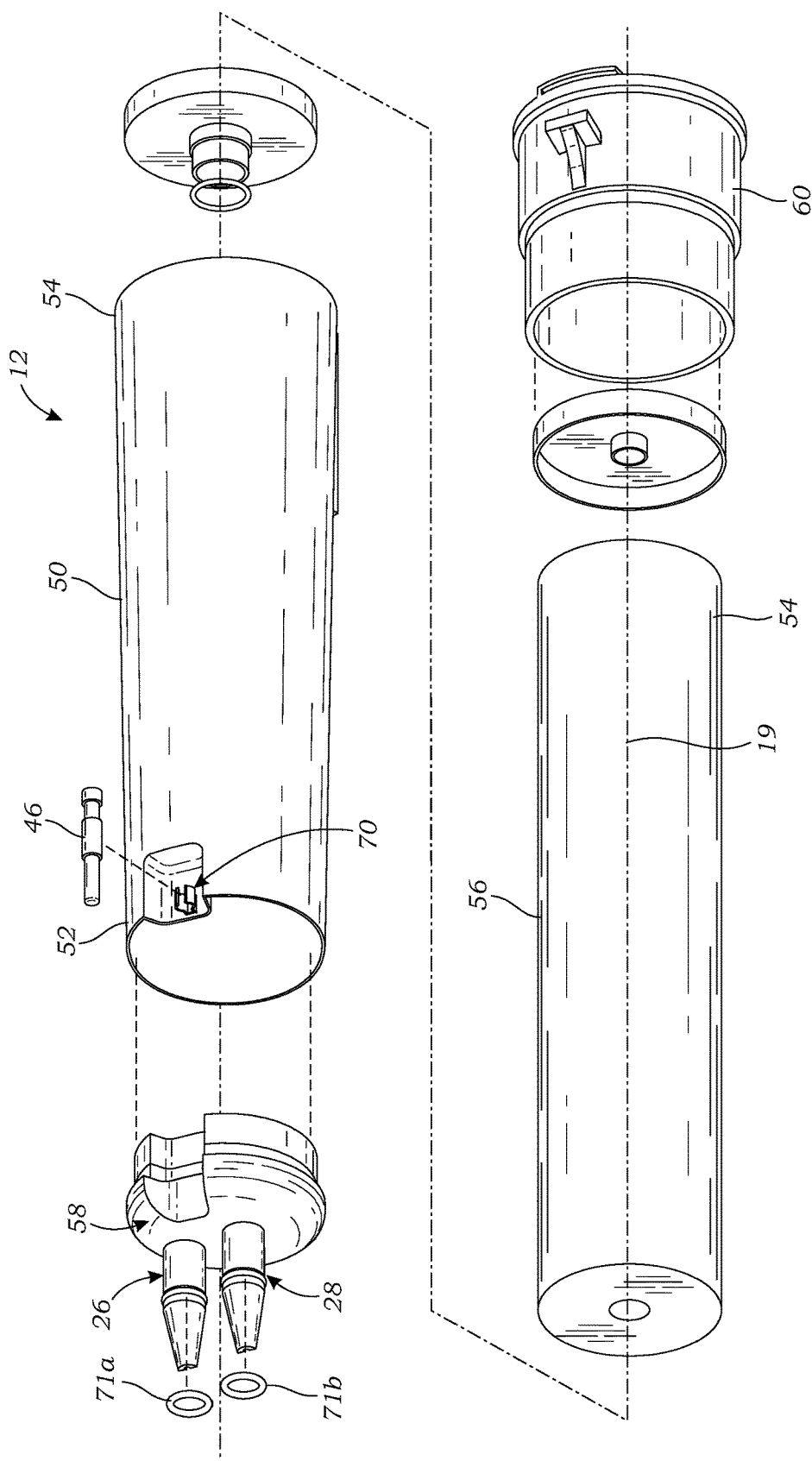
FIG. 2A is a perspective, exploded view of the filter cartridge of FIG. 1, according to one embodiment of the present invention.
Figure 2B:
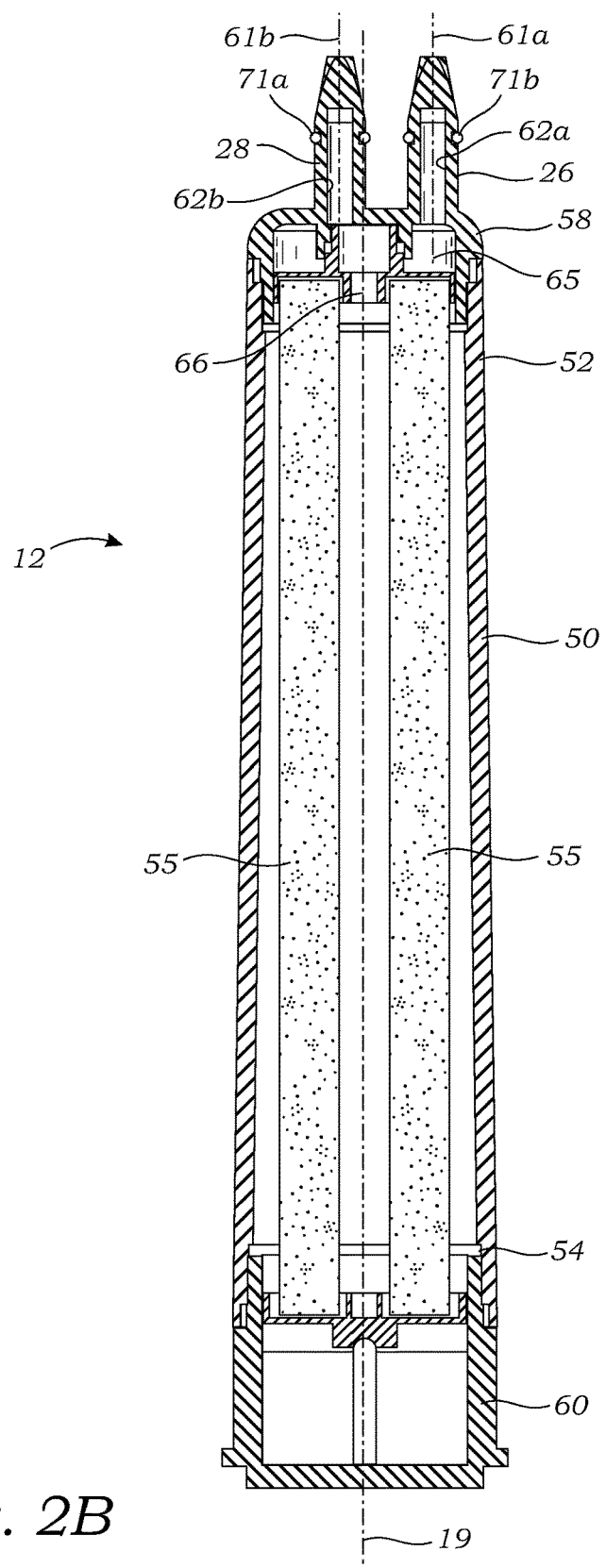
FIG. 2B is a side, cross-sectional view of the filter cartridge of FIG. 1, according to one embodiment of the present invention.

Referring to FIG. 1, one embodiment of a filter assembly 10 according to the present invention is shown. The filter assembly 10 includes a filter cartridge 12 which installs onto, and couples to, an appliance interface 14. The appliance interface 14 is an interface which is installed in an appliance, such as a refrigerator, washing machine, dishwasher, or other appliance, which utilizes a fluid, such as water, in which the fluid is treated using a filter cartridge 12. The filter assembly 10 is configured so that the filter cartridge 12 is easily removed and replaced when a filter cartridge 12 becomes old, clogged, and/or ineffective for treating the fluid being utilized by the appliance. For example, the filter assembly 10 is advantageously configured to seal the fluid ports 20, 22 on the appliance interface 14 which connect to respective fittings 26, 28 on the filter cartridge 12 when the filter cartridge 12 is not installed, and to automatically open the fluid ports 20, 22 on the appliance interface 14 when a filter cartridge 12 is installed onto the appliance interface 14, as described in more detail below.

Referring to FIGS. 1, 6A, 6B and 7, the interface 14 comprises a main interface housing 16 having a longitudinal axis 18 which is oriented substantially parallel, or coaxial, to a housing longitudinal axis 19 of the filter cartridge 12. An outlet port 20 and an inlet port 22 are disposed on the interface housing 16 and extend parallel to the longitudinal axis 18. The outlet port 20 is configured to receive an outlet fitting 26 of the filter cartridge 12. Similarly, the inlet port 22 is configured to receive an inlet fitting 28 of the filter cartridge 12.

Figure 6A:
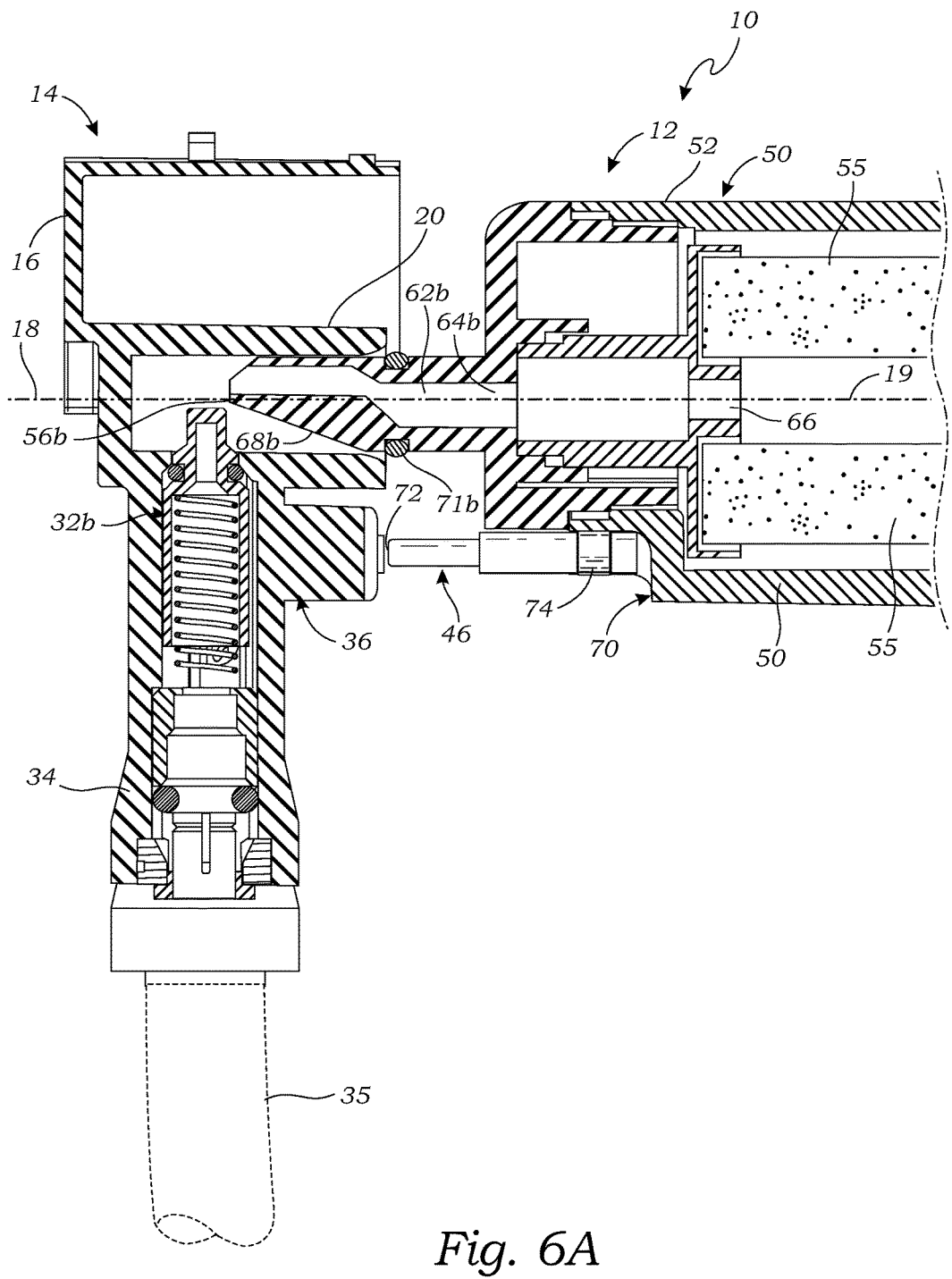
FIG. 6A is partial cross-sectional view of the fluid filter assembly of FIG. 1 with the filter cartridge partially installed on the appliance interface, according to one embodiment of the present invention.
Figure 6B:
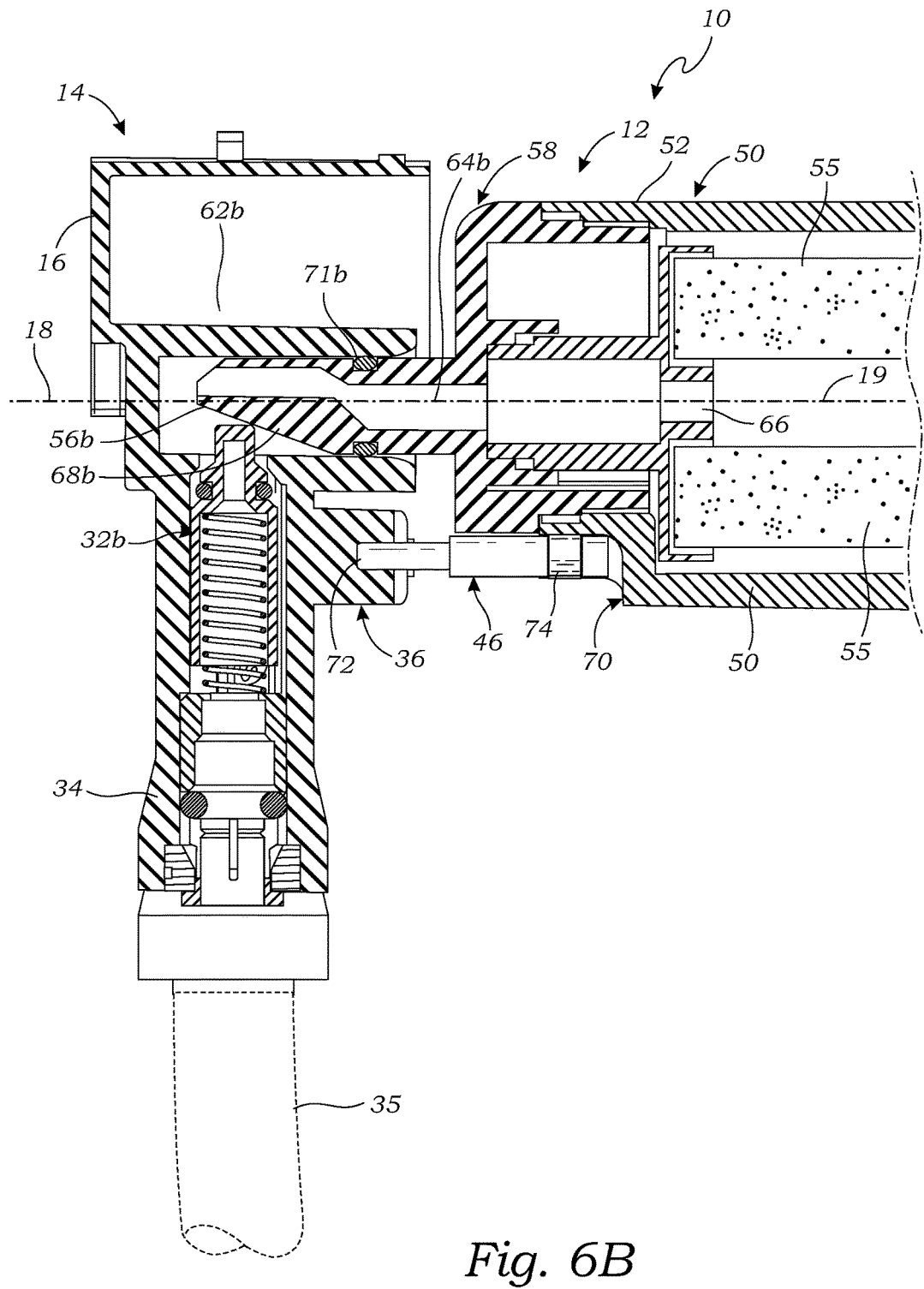
FIG. 6B is partial, cross-sectional view of the fluid filter assembly of FIG. 1 with the filter cartridge installed on the appliance interface, according to one embodiment of the present invention.

The interface 14 has an inlet supply port 34 which is in fluid communication with the inlet port 22. The inlet supply port 34 is configured to be connected to a fluid supply, such as water, for supplying the appliance with water. For example, the appliance may include internal tubes and/or pipes 35 having one end connected to the inlet supply port 34, and a second end for connection to a water supply. As shown in FIGS. 6A and 6B, the inlet supply port 34 has an inlet valve 32b which opens and closes the fluid connection between the inlet supply port 34 and the inlet port 22. The inlet valve 32b is biased to the closed position when a filter cartridge 12 is not fully installed onto the interface 14. The inlet valve 32b is actuated to an open position by insertion of an inlet fitting 28 of the filter cartridge 12 upon installing the filter cartridge 12 onto the interface 14, as described in more detail below.

The interface 14 also has an outlet supply port 30 in fluid communication with the outlet port 20. The outlet supply port 30 supplies treated (e.g., filtered) fluid back to the appliance after the fluid has flowed through the filter cartridge 12. For instance, the outlet supply port 30 may be connected to tubes/pipes 31 which are connected to a part of the appliance which utilizes the treated water, such as an ice maker or water dispenser. The outlet supply port 30 has an outlet valve 32a (not shown in the figures), which has the same structure and functions in the same way as the inlet valve 32b, described above. The outlet valve 32a is biased to the closed position when a filter cartridge 12 is not fully installed onto the interface 14. The outlet valve 32a is actuated to an open position by insertion of an outlet fitting 26 of the filter cartridge 12 upon installing the filter cartridge 12 onto the interface 14, as described in more detail below.

As can be seen in FIGS. 1, 6A and 6B, the outlet port 20 and inlet port 22 are oriented substantially perpendicular to the outlet supply port 30 and the inlet supply port 34. This orientation allows insertion of the outlet fitting 26 and inlet fitting 28 to move the respective outlet valve 32a and inlet valve 32b in a direction substantially perpendicular to the direction of insertion of the outlet fitting 26 and inlet fitting 28.

Figure 7:
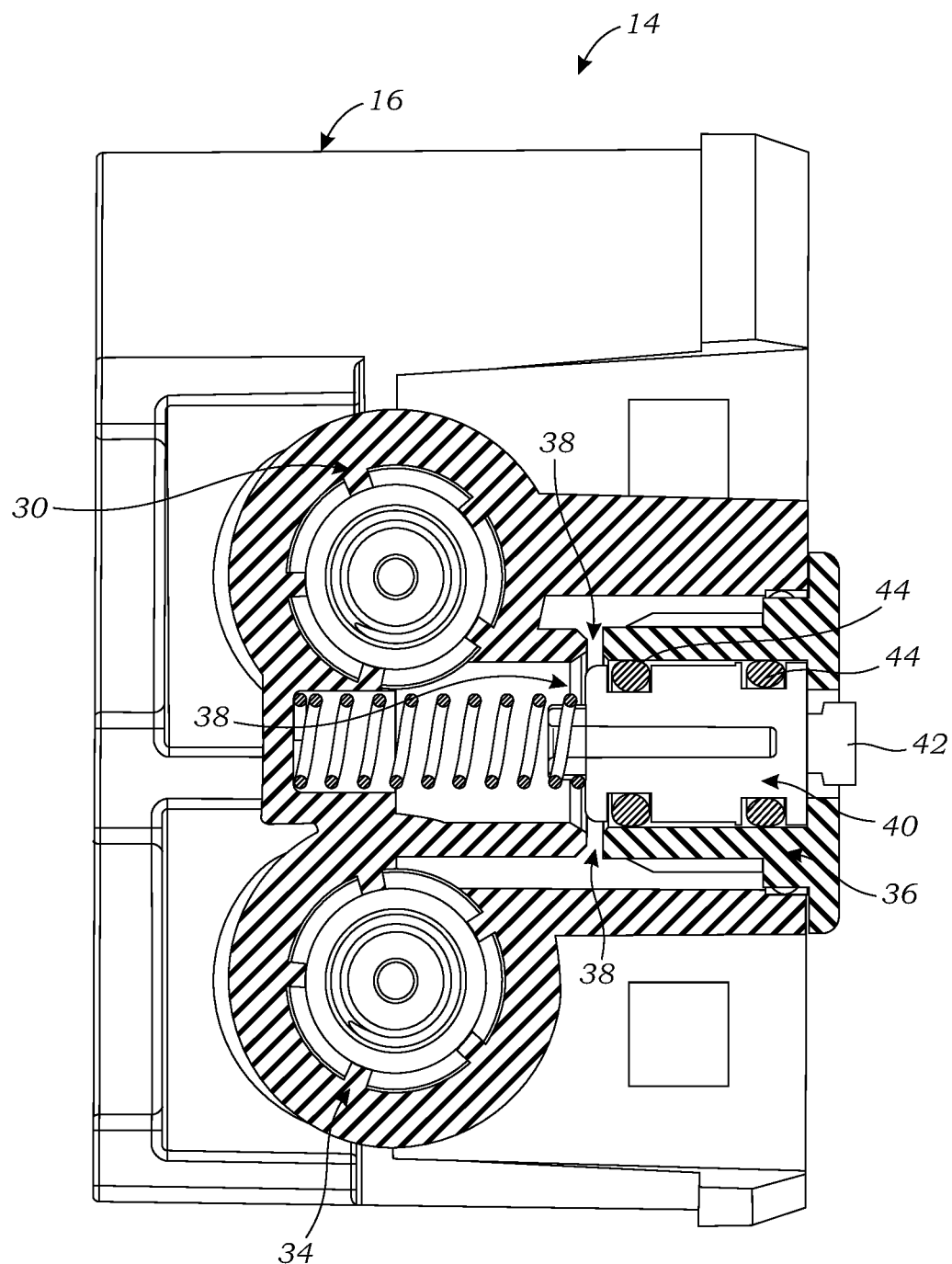
FIG. 7 is a partial, cross-sectional view of the appliance interface of FIG. 1 through the bypass valve, according to one embodiment of the present invention.

Referring now to FIGS. 1 and 7, the appliance interface 14 also includes a bypass valve assembly 36. The bypass valve assembly 36 provides the interface 14 with the ability to continue to supply fluid from the fluid supply to the appliance even when a filter cartridge 12 is not installed. As discussed above, when a filter cartridge 12 is not installed on the interface 14, the outlet valve 32a and inlet valve 32b are closed such that fluid cannot flow from the inlet supply port 34 to the inlet port 22. Hence, the supply fluid is simply blocked at the inlet valve 32b of the inlet supply port 34. The bypass valve assembly 36 includes a bypass passageway 38 which connects the inlet supply port 34 to the outlet supply port 30. The bypass valve assembly 36 also has a bypass valve 40 which opens and closes the bypass passageway 38. The bypass valve 40 is biased to a normally open position such that it is open (i.e., allows fluid to flow from the inlet supply port 34 through the bypass passageway to the outlet supply port 30) when there is not a filter cartridge 12 fully installed onto the interface 14.

FIG. 7 shows the bypass valve 40 in the open position such that it allows flow through the bypass passageway 38. The bypass valve 40 is actuated to a closed position by a bypass valve actuator 46 of the filter cartridge 12, when the filter cartridge 12 is installed onto the interface 14, as described in more detail below. The bypass valve actuator 46 pushes on a button 42 of the bypass valve 40 which pushes the bypass valve 40 inward (i.e., to the left in FIG. 7) until a pair of seals 44 on the bypass valve 40 block and seal the bypass passageway 38.

Turning to FIGS. 1-5, the filter cartridge 12 comprises a cartridge housing 50 having a first end 52 (a distal end) and a second end 54 (proximal end), extending along the housing longitudinal axis 19. The term "distal" and its other forms, and "proximal" and its other forms, are referenced based on the interface 14 being located distal to the filter cartridge 12, and the filter cartridge 12 being located proximal to the interface 14. The cartridge housing 50 in the illustrated embodiment is elongated and substantially cylindrical, but it is understood that the cartridge housing 50 may be any suitable shape, such as a housing having a rectangular, hexagonal, or other transverse cross-section.

The filter cartridge 12 has a filter media 55 contained within the cartridge housing 50. The filter cartridge 12 has a first end cap 58 which attaches to, and covers, the first end 52 of the cartridge housing 50, and a second end cap 60 which attaches to, and covers, the second end 54 of the cartridge housing 50. Although the illustrated embodiment shows the cartridge housing 50, first end cap 58 and second end cap 60 as separate pieces which are assembled together, any one or more of the components of the filter cartridge 12 may be integrally formed. For example, the cartridge housing 50 may be integrally formed with the first end cap 58 and/or the second end cap 60. Nevertheless, even when integrally formed, the cartridge housing 50, first end cap 58 and second end cap 60 are separate elements of the filter cartridge 12, and are delineated by the structure and function of each component.

As best shown in FIGS. 3-5, the first end cap 58 has an inlet fitting 28 which extends distally to an inlet distal end 56b which is spaced away from the first end cap 58 along an inlet longitudinal axis 61b. The inlet fitting 28 has an inlet lumen 62b which extends from the inlet distal end 56b to an inlet lumen proximal end 64b which is in fluid communication with a filter inlet 66 (see FIGS. 6A-6B). The inlet fitting 28 also has an inlet slanted exterior surface 68b. The inlet slanted exterior surface 68b slants toward the inlet longitudinal axis 61b as the surface 68b extends distally toward the inlet distal end 56b. As best shown in FIGS. 6A-6B, the inlet fitting 28 is configured to be received in the inlet port 22 of the interface 14. The inlet slanted exterior surface 68b is configured to actuate the inlet valve 32b upon insertion of the inlet fitting 28 into the inlet port 22.

The inlet fitting 28 has an inlet fitting seal 71b which provides a fluid tight seal between the inlet fitting 28 and the inlet port 22 when the inlet fitting 28 is received in the inlet port 22 with filter cartridge 12 installed on the interface 14.

As best shown in FIGS. 4 and 5, the inlet slanted exterior surface 68b is formed by tapering the thickness 80 of the inlet fitting 28 or by simply angling the exterior surface 68b. In other words, the inlet fitting 28 is not slanted, and does not have a slanted or inclined longitudinal axis, but instead has a substantially straight longitudinal axis 61b and a slanted exterior surface 68b.

The end cap 58 also has an outlet fitting 26 spaced apart from the inlet fitting 28. The outlet fitting 26 has the same configuration as the inlet fitting 28, and therefore the description of the inlet fitting 28 applies equally to the outlet fitting 26, where applicable. Thus, the outlet fitting 26 extends distally to an outlet distal end 56a which is spaced away from the first end cap 58 along an outlet longitudinal axis 61a. The outlet fitting 26 has an outlet lumen 62a which extends from the outlet distal end 56a to an outlet lumen proximal end 64a (see FIG. 5) which is in fluid communication with a filter outlet 65 (see FIG. 2B). The outlet fitting 26 also has an outlet slanted exterior surface 68a. The outlet slanted exterior surface 68a slants toward the outlet longitudinal axis 61a as the surface 68a extends distally toward the outlet distal end 56a. Although not shown in the figures, the outlet fitting 26 is configured to be received in the outlet port 20 of the interface 14, and the outlet slanted exterior surface 68a is configured to actuate the outlet valve 32a upon insertion of the outlet fitting 26 into the outlet port 20, in the same way as shown for actuation of the inlet valve 32b in FIGS. 6A-6B.

Referring to FIGS. 3A and 3B, the filter cartridge 12 also has a bypass valve actuator 46 which is attached only to the cartridge housing 50. As can be seen in the figures, the bypass valve actuator 46 is not attached to, and does not contact, the first end cap 58. The bypass valve actuator 46 extends distally from its attachment point on the cartridge housing 50 to an actuator distal end 72. The bypass valve actuator 46 is configured to actuate the bypass valve 40 of the bypass valve assembly 36 by pushing on the button 42 of the bypass valve 40 as the filter cartridge 12 is installed onto the appliance interface 14. The bypass valve actuator 46 in the illustrated embodiment comprises an elongated, cylindrical, rod 46 (or spike 46) having a proximal end connected to the cartridge housing 50 via a clip 74 attached to the cartridge housing 50. The cylindrical rod 46 may have portions of differing diameter which form a grooved portion having a recessed cylindrical portion (i.e., smaller diameter portion) which is received by the clip 74. The clip 74 has a plurality of pliant tangs (in this case, two tangs) which receive the grooved portion 76 of the rod 46. It is understood that the bypass valve actuator or rod 46 may be attached to the cartridge housing 50 by any other suitable means, such as attaching the rod 46 directly to the cartridge housing 50 using any suitable means, such as adhesive, fastener(s), welding (e.g., melt welding plastic), etc. Also, the bypass valve actuator or rod 46 does not have to extend distally in a straight line, but may curve or angle in order to position the actuator distal end 72 in a position to contact and actuate the bypass valve 40 as the filter cartridge is installed onto the interface 14.

In the illustrated embodiment, the cartridge housing 50 has a notch 70 proximate the first end 52 of the cartridge housing 50. The notch 70 is an area which is indented inwardly from the surrounding exterior surface of the cartridge housing 50. The bypass valve actuator 46 is attached to the cartridge housing 50 in the notch 70 of the cartridge housing 50. The notch 70 has a depth inwardly from the exterior surface of the cartridge housing 50 such that the bypass valve actuator 46 does not extend laterally (i.e, outwardly or radially outward) outside the notch 70.

The first end cap 58 may have a cap notch 78 which matches the notch 70 to provide an unobstructed path for the bypass valve actuator 46 to extend distally past the first end cap 58.

The process for using the filter assembly 10 to replace a filter cartridge 12 installed on an appliance interface 14 will now be described with reference to the figures. As shown in FIG. 6B, when a filter cartridge 12 is installed on the appliance interface 14, the inlet slanted exterior surface 68b of the inlet fitting 28 actuates the inlet valve 32b to the open position. Similarly (but not shown in the figures) the outlet slanted exterior surface 68a of the outlet fitting 26 actuates the outlet valve 32a to the open position. In addition, the bypass valve actuator 46 actuates the bypass valve 40 to the closed position (see FIG. 7) preventing fluid from flowing through the bypass passageway 38. In this condition, fluid coming from the fluid supply tubes/pipes 35 flows into the inlet supply port 34 of the appliance interface 14, through the open inlet valve 32b, and into the inlet fitting 28 of the filter cartridge 12. The fluid then flows through the inlet lumen 62b into the filter inlet 66, through the filter media 55, out through the filter outlet 65 to the outlet fitting 28. Then, the fluid flows through the outlet lumen 62a, through the open outlet valve 32a, into the outlet supply port 30 and finally to the supply outlet tubes/pipes 31 which supply the appliance with treated fluid.

The installed filter cartridge 12 is removed from interface 14 by pulling the filter cartridge 12 proximally along the housing longitudinal axis 19. As the filter cartridge 12 moves proximally, the inlet slanted exterior surface 68b of the inlet fitting 28 also moves proximally out of the inlet port 22 which releases the inlet valve 32b allowing it to move to the closed position, as shown in FIG. 6A. In the same manner, the outlet slanted exterior surface 68a of the outlet fitting 26 moves proximally out of the outlet port 20 which releases the outlet valve 32a allowing it to move to the closed position. At the same time, the bypass valve actuator 46 releases the bypass valve 40 allowing it to move to the open position (see FIG. 7). In this condition, the fluid coming from the fluid supply tubes/pipes 35 flows into the inlet supply port 34 of the appliance interface 14, and is blocked from flowing into the inlet fitting 28 by the inlet valve 32b. Instead, the fluid flowing into inlet supply port 34 flows through the bypass passageway 38 through the open bypass valve 40, into the outlet supply port 30 and then to the supply outlet tubes/pipes 31 which supply the appliance with untreated fluid, as the fluid cartridge 12 has been removed.

A new filter cartridge 12 is installed by inserting the cartridge 12 onto the interface 14 and pushing it distally. As the filter cartridge 12 moves distally onto the interface 14, the inlet fitting 28 is received in the inlet port 22, the outlet fitting 26 is received in the outlet port 20, and the bypass valve actuator 46 contacts the button 42 of the bypass valve 40. As the filter cartridge 12 is moved distally, the inlet slanted exterior surface 68b of the inlet fitting 28 actuates the inlet valve 32b to the open position as shown in FIG. 6B, the outlet slanted exterior surface 68a of the outlet fitting 26 actuates the outlet valve 32a to the open position, and the bypass valve actuator 46 actuates the bypass valve 40 to the closed position (see FIG. 7). When the fluid cartridge 12 is fully installed on interface 14, the fluid flow is the same as described above with the old filter cartridge 12 installed onto the interface 14.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. For example, the fluid flow may be reversed such that the inlet and outlet components are reversed. In addition, even though certain components of the invention are shown as separate parts, they may be integrally formed, and vice versa, while still being distinguishable from the other components both structurally and functionally. Accordingly, embodiments are intended to exemplify alternatives, modifications, and equivalents that may fall within the scope of the claims. The invention, therefore, should not be limited, except to the following claims, and their equivalents.

What is claimed is:

1. A filter cartridge for operatively coupling to an interface, the interface comprising a bypass valve for actuating the interface between a bypass mode in which fluid flowing through the interface does not flow through the filter cartridge and a treatment mode in which the fluid flowing through the interface is directed through the filter cartridge for treatment by the filter cartridge, the filter cartridge comprising:
   a cartridge housing having a first end and a second end and extending along a housing longitudinal axis through the first end and the second end;
   a filter media contained within the cartridge housing between the first end and the second end;
   a first end cap on the first end of the cartridge housing; and
   a bypass valve actuator attached to the cartridge housing and extending distally to an actuator distal end, the bypass valve actuator configured such that the actuator distal end actuates the bypass valve of the interface as the filter cartridge is coupled to the interface, the bypass valve actuator comprising:
      an elongated rod having a rod first end connected to the cartridge housing, wherein the elongated rod extends distally and substantially parallel to the housing longitudinal axis from the rod first end to a rod distal end which forms the actuator distal end, and further wherein the elongated rod is attached to the cartridge housing using a clip attached to the cartridge housing.

2. The filter cartridge of claim 1, wherein the clip comprises one or more pliant tangs into which the elongated rod is inserted to hold the rod first end.

3. The filter cartridge of claim 1, wherein the elongated rod has a first cylindrical portion having a first diameter, and a second cylindrical portion having a second diameter and which is received in the clip, and the second diameter is smaller than the first diameter.

4. The filter cartridge of claim 1, wherein the cartridge housing has a notch proximate the first end of the cartridge housing, and the bypass valve actuator is attached to the cartridge housing in the notch.

5. The filter cartridge of claim 4, wherein the notch has a depth from surrounding exterior surface of the cartridge housing and the bypass valve actuator does not extend radially outside the notch.

6. The filter cartridge of claim 1, further comprising a second end cap on the second end of the cartridge housing.

7. The filter cartridge of claim 1, wherein the first end cap is integrally formed with the cartridge housing.

8. A filter cartridge for operatively coupling to an interface, the interface comprising an inlet valve, an outlet valve and a bypass valve, the bypass valve configured to actuate the interface between a bypass mode in which fluid flowing through the interface does not flow through the filter cartridge and a treatment mode in which the fluid flowing through the interface is directed through the filter cartridge for treatment by the filter cartridge, the filter cartridge comprising:
   a cartridge housing having a first end and a second end extending along a housing longitudinal axis through the first end and the second end;
   a filter media contained within the cartridge housing between the first end and the second end;
   a first end cap on the first end of the cartridge housing;
   an inlet fitting extending from the first end cap to an inlet distal end spaced away from the first end cap along an inlet longitudinal axis, the inlet fitting having an inlet lumen in fluid communication with a filter inlet of the filter media, the inlet fitting having an inlet slanted exterior surface which slants toward the inlet longitudinal axis as the inlet slanted exterior surface extends toward the inlet distal end, the inlet slanted exterior surface configured to actuate the inlet valve of the interface;
   an outlet fitting extending from the first end cap to an outlet distal end spaced away from the first end cap along an outlet longitudinal axis, the outlet fitting having an outlet lumen in fluid communication with a filter outlet of the filter media, the outlet fitting having an outlet slanted exterior surface which slants toward the outlet longitudinal axis as the outlet slanted exterior surface extends toward the outlet distal end, the outlet slanted exterior surface configured to actuate the outlet valve of the interface; and a bypass valve actuator attached to the cartridge housing and extending distally to an actuator distal end, the bypass valve actuator configured such that the actuator distal end actuates the bypass valve of the interface as the filter cartridge is coupled to the interface, the bypass valve actuator comprising:

an elongated rod having a rod first end connected to the cartridge housing, wherein the elongated rod extends distally and substantially parallel to the housing longitudinal axis from the rod first end to a rod distal end which forms the actuator distal end, and further wherein the elongated rod is attached to the cartridge housing using a clip attached to the cartridge housing.

9. The filter cartridge of claim 8, wherein the clip comprises one or more pliant tangs into which the elongated rod is inserted to hold the rod first end.

10. The filter cartridge of claim 8, wherein the elongated rod has a first cylindrical portion having a first diameter, and a second cylindrical portion having a second diameter and which is received in the clip, and the second diameter is smaller than the first diameter.

11. The filter cartridge of claim 8, wherein the cartridge housing has a notch proximate the first end of the cartridge housing, and the bypass valve actuator is attached to the cartridge housing in the notch.

12. The filter cartridge of claim 11, wherein the notch has a depth from a surrounding exterior surface of the cartridge housing and the bypass valve actuator does not extend radially outside the notch.

13. The filter cartridge of claim 8, further comprising a second end cap on the second end of the cartridge housing.

14. The filter cartridge of claim 8, wherein the first end cap is integrally formed with the cartridge housing.

* * * * *